Aug. 17, 1943.   J. C. McCUNE   2,326,960
BRAKE MECHANISM
Filed Aug. 28, 1941   6 Sheets-Sheet 2

INVENTOR
JOSEPH C. McCUNE
BY
ATTORNEY

Aug. 17, 1943.  J. C. McCUNE  2,326,960
BRAKE MECHANISM
Filed Aug. 28, 1941   6 Sheets-Sheet 3

INVENTOR
JOSEPH C. McCUNE
BY
ATTORNEY

Aug. 17, 1943.  J. C. McCUNE  2,326,960
BRAKE MECHANISM
Filed Aug. 28, 1941  6 Sheets-Sheet 4

INVENTOR
JOSEPH C. McCUNE
BY
ATTORNEY

INVENTOR
JOSEPH C. McCUNE
BY
ATTORNEY

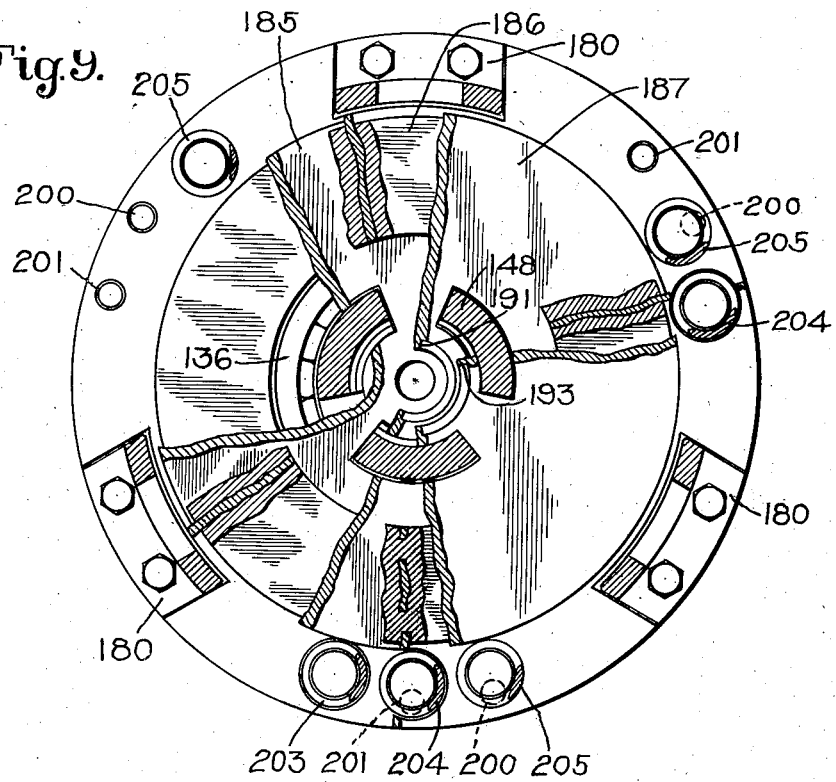

Patented Aug. 17, 1943

2,326,960

UNITED STATES PATENT OFFICE 2,326,960

BRAKE MECHANISM

Joseph C. McCune, Edgewood, Pa., assignor to The Westinghouse Air Brake Company, Wilmerding, Pa., a corporation of Pennsylvania Application August 28, 1941, Serial No. 408,578

22 Claims. (Cl. 188—106)

This invention relates to brake mechanisms and more particularly to the disk type for use on vehicles.

One object of the invention is the provision of an improved brake mechanism embodying means operative by fluid pressure for applying the brakes on a vehicle, and spring means which are normally energized by fluid pressure and which are operative upon the release of fluid pressure therefrom to also apply the brakes on the vehicle. The spring means may be arranged to either augment the degree of brake application obtained by the fluid pressure operated means, or for operation in an emergency, such as in the case of loss of fluid pressure on the vehicle, to apply the brakes in order to insure the safe stopping of the vehicle or for holding the vehicle stopped when there is no fluid pressure on the vehicle.

Another object of the invention is the provision of an improved disk brake mechanism adapted to be operated to apply the brakes on a vehicle either by the action of fluid under pressure or by the action of spring means, or by the conjoint action of both fluid under pressure and spring means.

Other objects and advantages will be apparent from the following more detailed description of the invention.

In the accompanying drawings, Fig. 1 is a plan view in section of the drive shaft and pinion of a vehicle with one embodiment of my improved brake mechanism applied thereto and showing a portion of the ring gear and differential housing.

Fig. 9 is a sectional view taken on line 9—9 of Fig. 6.

*General description*

The improved disk brake mechanism is arranged adjacent to and correlated in action with the usual differential 1 of a railway vehicle. As shown the embodiment of the invention illustrated in Figs. 1 to 5 of the drawings, the improved disk brake mechanism is associated with the differential 1 of a vehicle and is connected to and arranged forward of the usual differential housing 2. The embodiment of the invention illustrated in Figs. 6 to 9, inclusive, of the drawings, is shown associated with the differential 1 and is connected to and arranged to the rear of the usual differential housing 2.

*Description of embodiment shown in Figs. 1 to 5*

Figure 6:
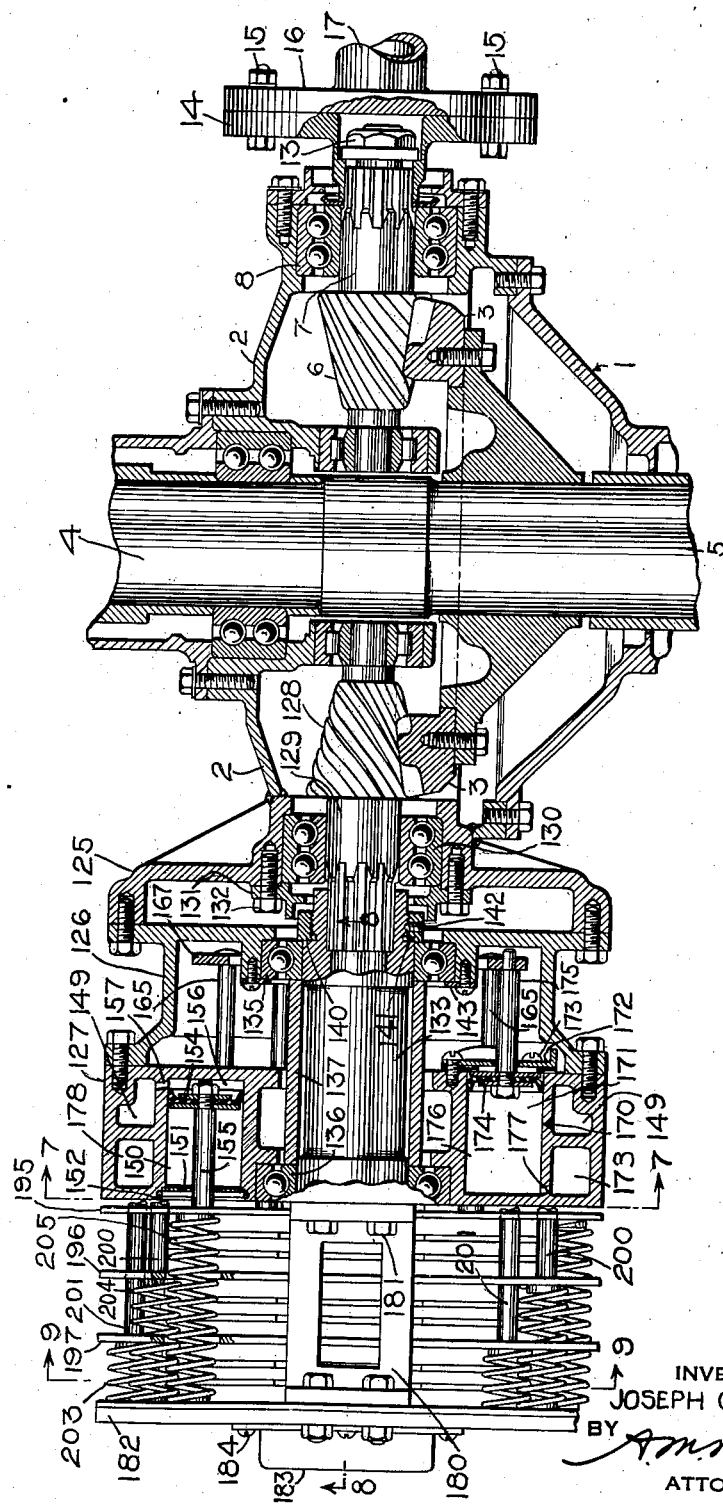
Fig. 6 is a plan view, in section, of the differential housing showing another embodiment of my improved brake mechanism attached thereto.

The differential housing 2 contains a ring gear 3 through which, as understood the axles 4 and 5, shown in Fig. 6, are driven in the usual well known manner. The housing also contains the usual drive pinion 6 which meshes with the ring gear 3. This pinion is carried by a shaft 7 suitably journaled in ball bearing members such as indicated at 8 and carried by the differential housing 2. The forward end of the shaft 7 extends beyond the outer face of the bearing members 8, a portion of the extension being splined, while the extreme end portion of the shaft is reduced in diameter and screwthreaded.

An annular sleeve member 10, arranged in axial alignment with the shaft 7, having at one end telescoping connection with the splined portion of the shaft 7 for rotation therewith, is rigidly connected to the shaft 7, by means of an annular washer 11 which encircles the extreme end portion of the shaft and engages a shoulder 12 provided on the interior of the member 10, and which is secured in place by a nut 13 having screwthreaded engagement with the threaded end of the shaft 7. An annular flange 14, welded or otherwise secured, to the opposite end of the sleeve member 10 is provided, which is rigidly connected by means of bolts 15 with a corresponding annular flange 16, which is secured to the usual drive shaft 17.

Contained within the sleeve member 10 and extending longitudinally thereof from the washer 11 to substantially the clamping face of the flange 14 of the sleeve member is an adjusting and locking element 18 for the nut 13. This element is tubular in form and is preferably of hexagonal shape in cross section and at one end fits tightly over the peripheral faces of the nut 13. The opposite end of the element is preferably provided with an enlarged hexagonal portion 19 adapted to receive a similarly shaped tool for rotating the element when it is desired to either tighten or loosen the nut 13. A pin 20 secures the element to the sleeve member, so that the element locks the nut against accidental rotation relative to the shaft 7.

Encircling the splined end portion of the sleeve member 10 and secured to the forward face of the differential housing 2 by bolts 21 is a cover plate 22. This cover plate holds the bearing member 8 in position in the differential housing 2. The forward end wall 24 of the cover plate is spaced away from the bearing member 8, forming a chamber 25 between the forward end of the bearing member 8 and the inside wall of the cover plate, which chamber is in constant open communication with the inside of the differential housing 2, through the bearing member 8. The end wall of the cover plate is provided with a central opening 26 of such size that the outside diameter of the sleeve 10 and the wall of the cover make a snug fit so as to cut off communication between the chamber 25 and the atmosphere. The inside wall of the cover plate is provided with an annular trough 27 which is constantly open to the chamber 25 and which, as will presently be described in more detail, is for the purpose of assisting in preventing lubricant which may leak through the ball bearing from reaching the fluted end portion of the sleeve 10 outside the chamber 25.

Contained in chamber 25 and clamped between the forward ends of the inner ball bearing race member and the inner end of the sleeve member 10 for rotation therewith is a lubricant deflecting ring 28 which is adapted to conduct any lubricant which may escape from the lubricant supply in the differential housing through the bearing member 8 to the trough 27. The outer edge portion of this ring is flared so as to overlie the outer wall of the trough 27. This insures the delivery of the leakage lubricant to the trough 27. Any lubricant thus delivered to the trough flows under the influence of the force of gravity to the underside of the trough and from thence to the chamber 25, from whence it is free to flow back to the differential supply through the bearing member 8.

The cover plate 22 is also provided with a plurality of forwardly projecting radially arranged lugs 31 which carry an annular plate 29 for supporting a plurality of radially arranged cylinders 30 which are welded or otherwise secured to the plate.

The brake cylinders are arranged outside of the lugs 31 and their axes are parallel with the axis of the shaft 7. Each brake cylinder is provided with a movable abutment in the form of a piston 32 having a stem or push rod 33.

Figure 2:
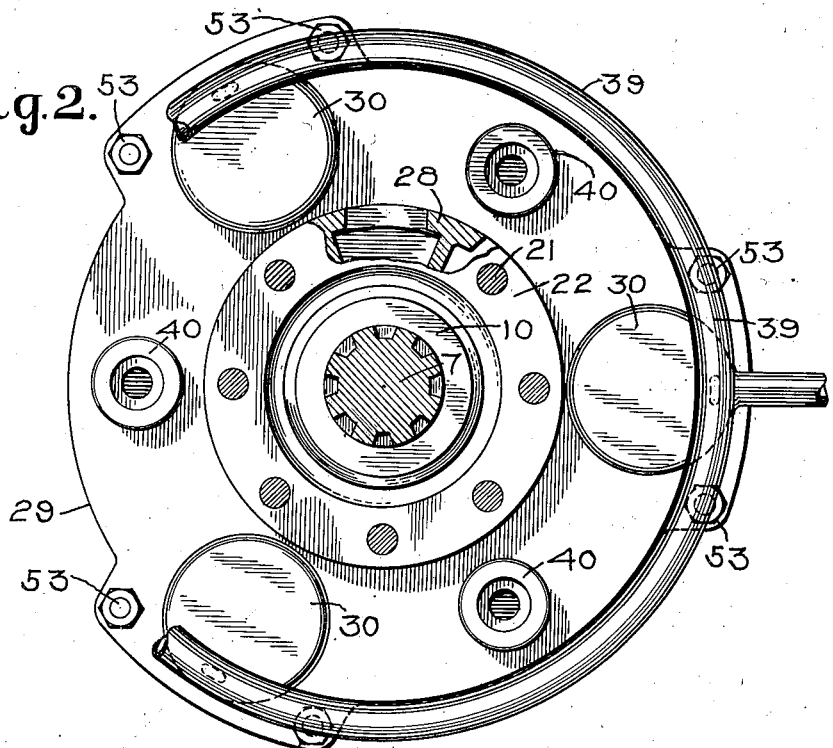
Fig. 2 is a sectional view taken on the line 2—2 of Fig. 1.

At one side of the piston 32 there is a pressure chamber 38 which is connected to a circular fluid conduit 39, as best shown in Fig. 2 of the drawings, through which fluid under pressure is adapted to be supplied to and released from the chambers 38 by means of suitable fluid pressure controlling apparatus, such for instance, as a brake valve device, not shown, for effecting reciprocation of the piston 32 and the attached stem 33.

Carried by the plate 29 and alternately arranged with relation to the brake cylinders 30 are a plurality of spring motors which, as will later be described, are operative independently or conjointly with the pistons 32 to effect an application of the brakes.

Each of these spring motors comprises a tubular casing 40 having a perforated wall 41 at one end and being open at the other end, the open end extending through an opening in the plate 29 and being rigidly secured to the plate. It will be understood that if desired the tubular casing 40 may be made integral with the plate 29.

Telescoped within the casing 1 and movable back and forth through the open end thereof is a tubular follower member 43 having at one end a perforated wall 44 and being open at the other end, the open end being provided with an annular flange 45 which extends toward the wall of the casing 40.

Interposed between and operatively engaging the wall 41 of the casing and the flange 45 of the follower member 43 is a spring 46 which is normally maintained compressed by the follower member.

Contained in the follower member is a plunger 47 which is operative back and forth through the open end of the follower member and which, adjacent its outer end, is provided with a collar 48 which engages an annular ring 49 which ring encircles the sleeve member 10 and which is movable in directions longitudinally thereof. Also contained in the follower member and interposed between and operatively engaging the end wall 44 of the follower member and the collar 48 is a spring 50 which is normally maintained compressed by the collar 48 under the influence of a fluid pressure brake releasing motor 51 hereinafter fully described.

Radially disposed about the sleeve member 10 and circumferentially spaced from each other are spaced longitudinally extending cage members 52 which are secured at one end to the plate 29 by means of bolts 53, the plate forming a rigid tie between the members.

Abutting the other or right hand end of the cage members 52 is an annular disk 55 which is coaxial with the sleeve member 10 and abutting this disk is an annular release cylinder member 56. The cage member 52, annular disk 55 and release cylinder member 56 are rigidly clamped together by means of bolts 57.

Three annular rotatable friction brake elements or disks 60, 61 and 62 encircle the sleeve member 10 and are splined thereto, to provide a driving and supporting connection between the sleeve member and said brake elements so that these brake elements at all times turn with the sleeve member 10. The sleeve member is provided with stop shoulders 63, 64 and 65 which are adapted to be engaged by the rotatable elements or disks 60, 61 and 62, respectively, for defining the release position of said elements.

A plurality of annular non-rotatable friction brake elements or disks 66, 67, 68 and 69 are interleaved with the rotatable brake elements 60, 61 and 62. The non-rotatable element or disk 66 is disposed at one end of the pile adjacent the outer face of the rotatable element 60, the non-rotatable element 67 is disposed between the rotatable elements 60 and 61, the non-rotatable element 68 is disposed between the rotatable elements 61 and 62, while the non-rotatable element 69 is disposed adjacent the outer face of the rotatable element 62 at the opposite end of the pile.

Each of the non-rotatable braking elements 66, 67 and 68 are provided with a plurality of radially extending ears 70 which are received in suitable open ended slots provided in the members 52 so as to interlock the braking elements and the members. The slots in the elements or disk 66 receives the bearing portions 72 of the cage members 52 upon which said element is slidably mounted. In like manner the non-rotatable element 67 is slidably mounted on the bearing portions 73 of the cage members, while the non-rotatable braking element 68 is slidably mounted in the same manner on bearing portions 74 of the cage members. The cage member 52 thus acts to support the non-rotatable braking elements 66, 67 and 68 in coaxial relation with the rotatable braking elements and also holds them against turning relative to the differential housing 2. The non-rotatable element 69 disposed adjacent the outer face of the rotatable element 63 is securely fixed to the annular disk 55, by means of a plurality of spaced rivets 75.

Figure 1:
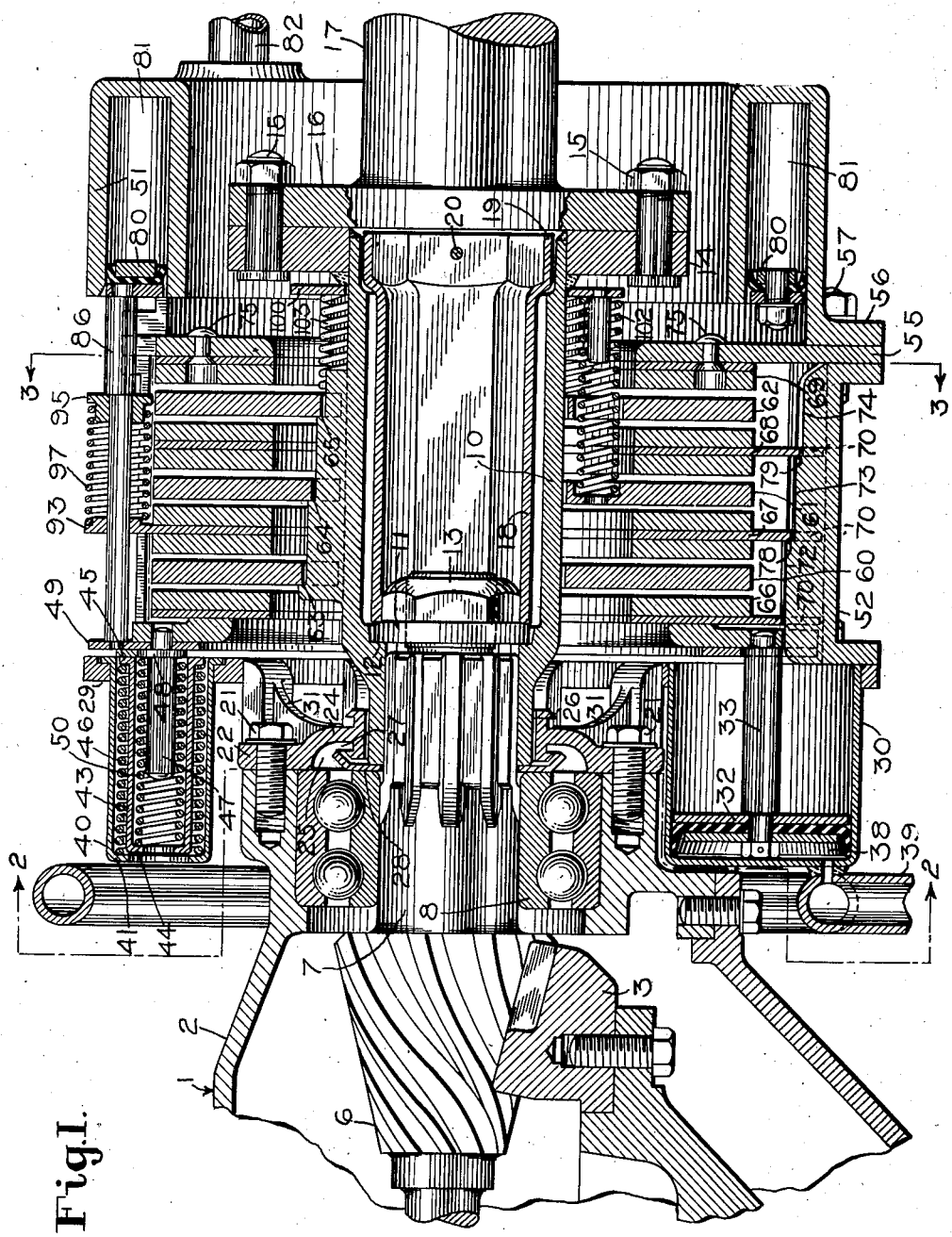

As shown in Fig. 1 the bearing portions 72, 73 and 74 of the cage members 52 are so arranged as to provide stop shoulders 78 and 79, respectively. These shoulders are adapted to be energized by the non-rotatable braking elements 67 and 68, respectively, for defining the release position of said elements in which they are out of engagement with the rotatable braking elements 61 and 62. The non-rotatable element or disk 66 is adapted to abut the end of each brake cylinder stem or push rod 33, so that its release position is defined by the stems 33 when the pistons 32 are in their release position.

The release cylinder member 56 is provided with an annular piston chamber 81 which is in axial alignment with the several annular braking elements. This chamber is substantially U-shaped in cross-section, with its open end facing the annular braking elements. Slidably mounted in this chamber is a movable abutment in the form of a piston 80.

At one side of the piston 80 the piston chamber 81 is connected to a pipe 82 through which fluid under pressure is adapted to be supplied to and released from said chamber for effecting the operation of the brake mechanism to apply and release the brakes as will later be described.

Figure 4:
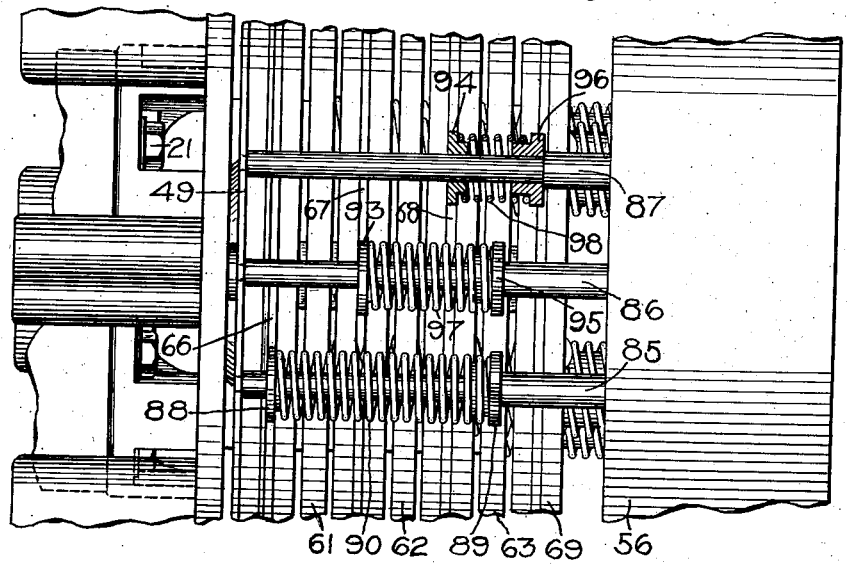
Fig. 4 is a sectional view taken on the line 4—4 of Fig. 3.

Projecting from the opposite or non-pressure face of the piston 80 there are three sets of push rods or stems, each set comprising three rods or stems 85, 86 and 87, as best shown in Fig. 4 of the drawings. These sets of rods or stems are alternately spaced with relation to the cage members 52 at points radially outward from the periphery of the rotatable and non-rotatable brake elements and the outer ends of the rods or stems operatively engage the adjacent face of the annular ring 49.

The supply of fluid under pressure to and its release from the piston chamber 81 by way of pipe 82 may be controlled in any desired manner, as for instance, the pipe 82 may be connected to the usual emergency control pipe or a brake equipment, which pipe is normally charged with fluid under pressure and which in case of emergency is adapted to be vented for effecting an application of the brakes. When the chamber 81 is charged with fluid under pressure from the control pipe 82 the fluid pressure acting on the piston 80 is adapted to move the piston to its normal release position in which position the piston is shown in Fig. 1 of the drawings. Movement of the piston 80 to this position is adapted to compress the springs 46 and 50, through the medium of the release cylinder push rods or stems and the annular ring member 49. Upon the venting of fluid under pressure from the chamber 81 the force of the springs 46 and 50 is adapted to urge the ring 49 in a direction toward the right hand, such movement in turn will urge the annular brake elements or disks into frictional interengagement to effect an application of the brakes.

Figure 3:
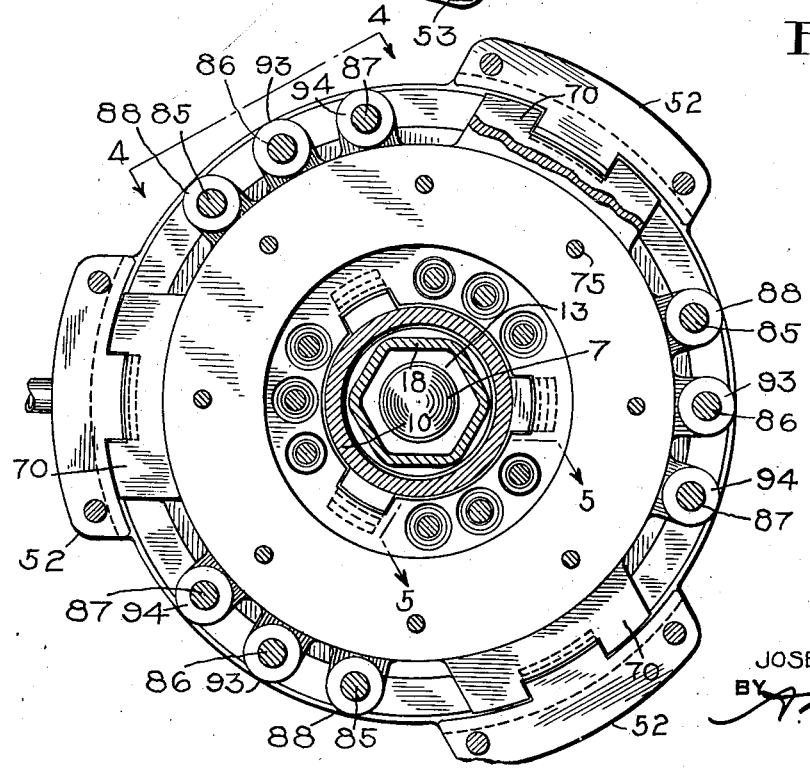
Fig. 3 is a sectional view taken on the line 3—3 of Fig. 1.

As best shown in Fig. 3 each release cylinder push rod or stem 85 is slidably mounted in a suitable aligned opening provided in a lug 88 which projects radially from the non-rotatable brake element or disk 66. Each of these push rods or stems, as best shown in Fig. 4, is provided adjacent its inner end with a collar 89. Encircling each push rod or stem 85 and bearing at one end against the lug 88 of the non-rotatable brake element 66 and at the opposite end against the collar 89 is a release spring 90 which is provided for the purpose of urging this brake element into contact with the ends of the piston rods 33 and thus, when the pressure chamber 38 is deplete of fluid under pressure the spring acts to maintain the brake element in its release position.

In like manner each release cylinder push rod or stem 86 is slidably mounted in a suitably aligned opening provided in a lug 93 which projects radially outwardly from the non-rotatable brake element or disk 67 and each release cylinder push rod or stem 87 is slidably mounted in a suitably aligned opening provided in a lug 94 which projects radially outwardly from the non-rotatable brake element or disk 68. Each push rod or stem 86 is provided adjacent its inner end with a collar 95 and in like manner each push rod or stem 87 is provided with a collar 96. Encircling each push rod or stem 86 and bearing at one end against the lugs 93 of the non-rotatable braking element 67 and at the opposite end against the collar 95 is a release spring 97 which is provided for the purpose of urging the non-rotatable brake element or disk 67 into contact with the shoulder 78 and thus to its release position. Encircling each push rod or stem 87 and bearing at one end against the lug 94 on the non-rotatable element 68 and at the opposite end against the collar 96 is a release spring 98 which is provided for the purpose of urging the non-rotatable brake element or disk 68 into contact with the stop shoulder 79 and thus to its release position.

Slidably mounted on the sleeve member 10 adjacent the flange 14 and encircled by the annular brake cylinder member 56 is an annular spring seat ring 100.

Figure 5:
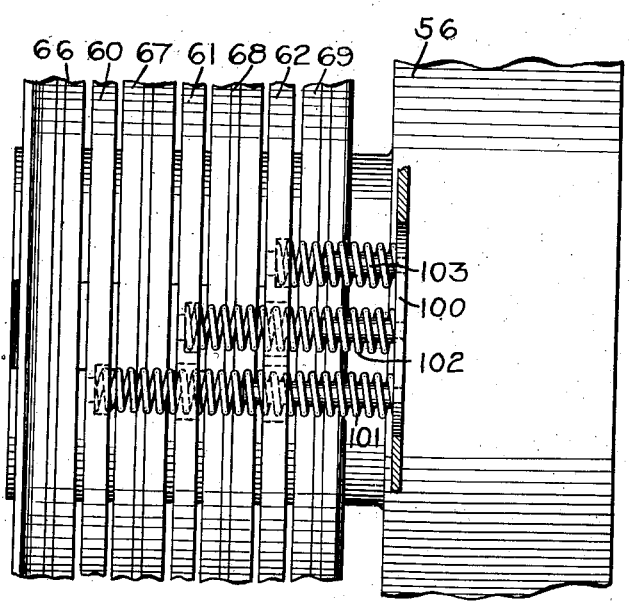
Fig. 5 is a sectional view taken on the line 5—5 of Fig. 3.

Three sets of release springs, equally spaced from each other, around the sleeve member 10, are provided for maintaining the rotatable braking elements or disks 60, 61 and 62 in their release position, in which position they are shown in Fig. 1 of the drawings. Each set comprises three springs 101, 102 and 103, as best shown in Fig. 5 of the drawings.

Each of the springs 101 seat, at one end, on the annular seat ring 100 and extends through suitable aligned openings in the rotatable braking elements or disks 62 and 61 and at the opposite end engages the rotatable element 60. The spring urges the element to its release position in abutting contact with the stop shoulder 63.

In like manner each of the springs 102 and 103 seat, at one end, on the annular seat ring 100 and each of the springs 102 extend through suitable aligned openings in the rotatable element 62 and at the opposite end engage the rotatable braking element 61 thereby urging this element to its release position in abutting contact with the stop shoulder 64. Each of the springs 103 at the opposite end engage the rotatable element 62 thereby urging this element to its release position in abutting contact with the stop shoulder 65.

*Operation of the embodiment shown in Figs. 1 to 5*

Let it be assumed that piston chamber 81 in the release cylinder member 56 is charged with fluid under pressure supplied through the pipe 82, which, as before mentioned, may be supplied with fluid under pressure from a normally charged emergency pipe of any conventional type of brake equipment. With the chamber 81 thus charged, the piston 80 and thereby the ring 49 are urged to their release position, as shown in Fig. 1, thereby energizing or compressing the brake applying springs 46 and 50.

Let it be further assumed that the pressure chamber 38 in the brake cylinder 30 are devoid of fluid under pressure, the chamber being open to the atmosphere through the pipe 39 which, as before stated, may be controlled by means of the usual brake valve device. With the pressure chambers 38 thus in open communication with the atmosphere the brake elements or disks of the brake mechanism will be urged to their release position by means of the release springs hereinbefore described and shown but in Figs. 4 and 5 in the drawings. With the several parts of the brake apparatus conditioned as just described, the brake elements or disks will be out of braking engagement with each other, so as to permit the rotatable brake elements or disks 60, 61 and 62 to freely rotate with the sleeve 10 when the vehicle is in motion.

If now it is desired to effect a service application of the brakes, fluid under pressure may be supplied through pipe 39 to the brake cylinder pressure chamber 38. If however it is desired to effect an emergency application fluid under pressure is vented from the piston chamber 81 in the release cylinder member 56 or, if desired, fluid under pressure may be vented from the piston chamber 81 at the same time as fluid under pressure is supplied to the pressure chamber 38.

Let it be assumed however that the piston chamber 81 in the release cylinder member 56 is maintained charged with fluid under pressure and that fluid under pressure is supplied to the brake cylinder pressure chamber 38. The pressure of fluid thus supplied acts on and moves the brake cylinder piston 32 and thereby the push rods or stems 33 relative to the differential housing 2 in the direction of the right hand.

As the push rods or stems 33 are thus moved they will effect axial movement of the non-rotatable brake element 66 into contact with the rotatable element 60 which will then be moved axially into engagement with the non-rotatable brake element 67. The non-rotatable brake element 67 will in turn be moved axially into contact with the rotatable brake element 61 which in turn will be moved into engagement with the non-rotatable brake element 68. The non-rotatable brake element or disk 68 will in turn be moved axially into contact with the rotatable brake element 62 which in turn will be moved into contact with the non-rotatable brake element 69 which is backed up against axial movement of the annular disk 55. After the several brake elements are thus moved into frictional interengagement the pressure of fluid acting on the brake cylinder pistons 32 will force same against each other and since the non-rotatable brake elements are held against rotation by the differential housing 2, the rotatable brake elements and thereby the sleeve member 10 and in turn the vehicle wheels will be braked. The degree with which the wheels will be braked is dependent upon the pressure of fluid supplied to the pressure chamber 38, and this pressure may be varied in the usual manner by varying the pressure of fluid supplied to the pipe 39.

In order to effect a release of the brakes after an application effected as just described, the fluid under pressure is vented from the brake cylinder pressure chambers 38 through the pipe 39, following which the release springs acting on the brake elements or disks will effect movement thereof back to their release positions as above described, so that the rotatable brake elements or disks and thereby the sleeve 10 will again be free to rotate.

Let it be assumed that the brake cylinder pressure chambers 38 are at atmospheric pressure and that fluid under pressure is vented from the piston chamber 81 in the release cylinder member 56 by way of pipe 82 and the emergency pipe to which pipe 82 may be connected. Upon the venting of fluid under pressure from the piston chamber 81 the pressure of springs 46 and 50 move the piston 80 in a direction away from the differential housing 2, through the medium of the push rods or stems 85, 86 and 87 and the annular ring 49. With the brakes released, the springs become effective through the medium of said annular ring 49 to urge the annular brake elements or disks into frictional interengagement as before described to effect braking action. The degree of braking due to the operation of the springs 46 and 50 may be any desired value dependent upon the force characteristics of the springs.

In order to release an application of the brakes effected by operation of the springs 46 and 50, fluid under pressure will be supplied to the pipe 82 and thereby to the piston chamber 81 for moving the piston 80 back to its release position as shown. As the piston 80 is thus operated it acts to compress or energize the springs 46 and 50, through the medium of the push rods or stems and the annular ring 49 thereby permitting the other parts of the brake mechanism to be returned to their release positions so that the rotatable brake elements or disks and thereby the sleeve 10 will again be free to rotate.

If it is desired to brake the vehicle to a degree greater than obtainable by the separate action of the brake cylinder device 30 or by the springs 46 and 50, the pressure of fluid may be vented from the piston chamber 81 in the release cylinder member 56 at the same time as fluid under pressure is supplied to the pressure chambers 38 of the brake cylinders 30. Under this condition the brake mechanism will be operated, by the combined force of said springs and the pressure of fluid in said chambers to effect braking of the vehicle. In order to release the brakes after an application effected as just described, fluid under pressure will be vented from the pressure chamber 38 of the brake cylinders 30 and the piston chamber 81 in the release cylinder member 56 will be recharged with fluid under pressure following which the different parts of the brake mechanism will be moved to their release positions as before described to again free the rotatable brake elements and the sleeve 10 for rotation.

From the foregoing description it will be seen that the pipe 39 is normally vented and is adapted to be supplied with fluid under pressure when effecting an application of the brakes, and that the pipe 82 is connected to an emergency pipe which is normally charged with fluid under pressure and from which fluid under pressure is adapted to be vented in case of emergency, it will be apparent that the brakes may be controlled by supplying fluid under pressure to the pressure chambers 38 of the brake cylinders 30 in the usual manner, or by the springs 46 and 50 upon emergency venting of the emergency pipe, or by the combined action of fluid pressure in pressure chamber 38 and of the springs 46 and 50 if fluid under pressure is vented from the emergency pipe at the same time as fluid under pressure is supplied to the pipe 39.

In the event that the supply of fluid under pressure on the vehicle is lost due to a failure of any part of the brake apparatus, such as a ruptured hose or pipe, it will be apparent that springs 46 and 50 will become effective to automatically apply the brakes on the vehicle and to bring the vehicle to a stop. This, as will be apparent, is a very desirable feature. It will also be noted that the action of springs 46 and 50 may be employed for holding the brakes on a vehicle applied to hold a car stopped without having to maintain a supply of compressed air on the vehicle.

*Description of embodiment shown in Figs. 6 to 9*

The brake mechanism just described is connected to and arranged forwardly of the usual differential housing 2. In the embodiment of the invention as shown in Figs. 6 to 9 the braking mechanism is connected to and arranged rearwardly of the usual differential housing 2.

In this latter embodiment the drive shaft 17 is connected to the drive pinion 6 in the usual manner, and the pinion 6 meshes with the ring gear 3 to form the drive connection to the axles 4 and 5 in the usual well known manner.

For the purpose of the present embodiment of the invention a casing 125, welded or otherwise secured to the rear of the usual differential housing 2 is provided for supporting the brake mechanism. Secured to a bolting face at the rear end of this casing is an annular filling piece 126 to which is secured an annular cylinder portion 127.

Contained within the usual differential housing 2 and located, preferably diametrically opposite the drive pinion 6 is a brake pinion 128. This pinion meshes with the ring gear 3 and is carried by a brake shaft 129 a portion of which extends rearwardly into the casing 125 and is suitably journalled in the casing 125 by means of a ball bearing member 130 carried by the casing 125. This bearing member is held in place by means of a bearing retainer 131 which is secured to the casing 125 by means of a plurality of spaced bolts 132 and is provided with a central opening through which extends the splined rear end of the shaft 129.

A tubular shaft 133, arranged in axial alignment with the shaft 129 and having at one end telescoping connection with the splined portion of the shaft 129 for rotation therewith, is suitable journalled in ball bearing members 135 and 136, The bearing members 135 and 136 are carried by the filling piece 126 and the brake cylinder portion 127, respectively, and are retained in spaced relation by means of a sleeve 137 which encircles the shaft 133 and which at one end abuts the rear end of the inner ball bearing race member 135 and at the opposite end abuts the forward end of the inner ball bearing race member 136.

Abutting the forward or opposite end of the inner ball bearing race member 135 and a shoulder 140 provided on tubular shaft 129 is an annular ring 141 having screw-threaded engagement with the threaded end portion of the shaft 129, which annular ring is locked in place by means of a set screw 142.

Encircling the forward end of the sleeve 137 and secured to an annular face of the casing 125 is a cover plate 143. This cover plate holds the outer race of the bearing member 135 in the casing 125.

Figure 8:
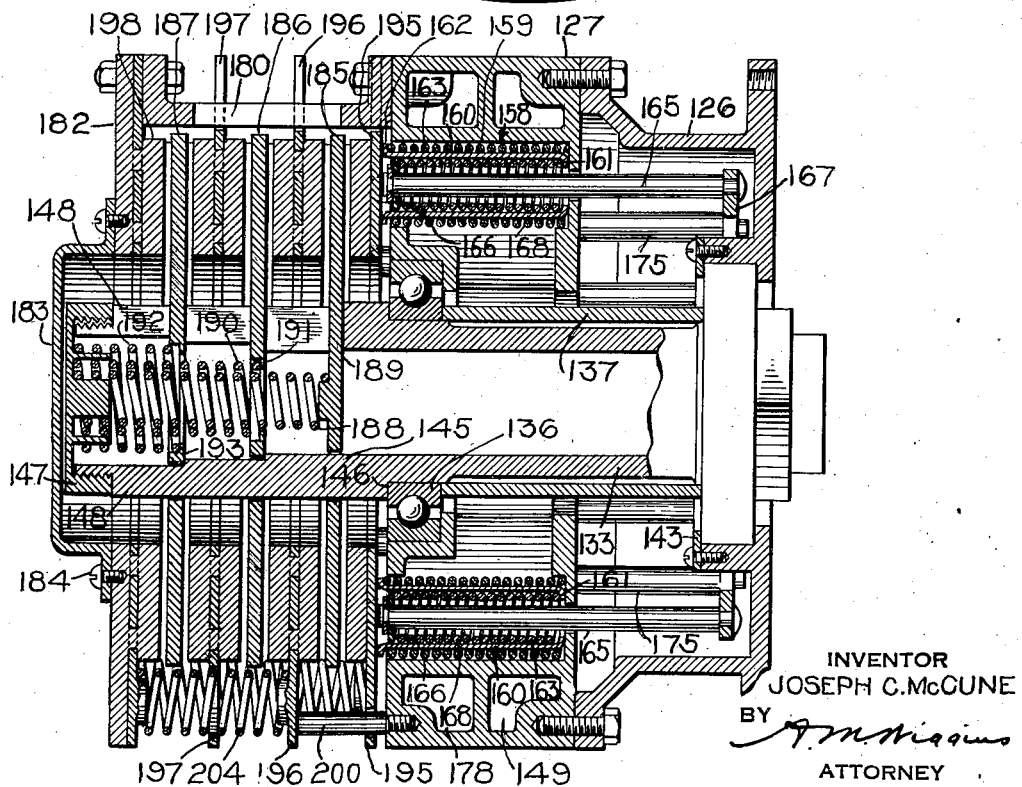
Fig. 8 is a sectional view taken on the line 8—8 of Fig. 6.

The rear end portion 145 of the tubular shaft 133 is of larger diameter than the forward end thereof and extends rearwardly beyond the cylinder portion 127. This enlarged portion forms a shoulder 146 on the shaft, which shoulder holds the bearing member 136 in the cylinder portion 127. The extreme rear end portion of the enlarged portion of the shaft is screwthreaded to accommodate a nut 147, as best shown in Fig. 8 of the drawings. This enlarged portion is provided with three spaced fingers 148, as best shown in Figs. 8 and 9 of the drawings, for a purpose hereinafter described.

The cylinder portion 127 contains three equally spaced radially arranged brake cylinders 150. Each of these brake cylinders has a bore which is open at the rear end of the cylinder portion 127 and the open end of each bore is closed by a non-pressure head 151 which is secured in place by means of a snap ring 152. Contained in each brake cylinder bore is a movable abutment in the form of a piston 154 having a stem or push rod 155 which extends rearwardly through a suitable opening in the non-pressure head 151.

At one side of each of the pistons 154 there are piston chambers 156, which are constantly connected with each other through passages 157 leading from a main circular passage 149 in the cylinder portion 127. The circular passage 149 is connected to a pipe 144 through which fluid under pressure is adapted to be supplied to and released from the piston chambers 156 by means of suitable fluid pressure controlling apparatus, such for instance, as a brake valve device, not shown, for effecting reciprocation of the pistons 154 and the attached push rods or stems 155.

Figure 7:
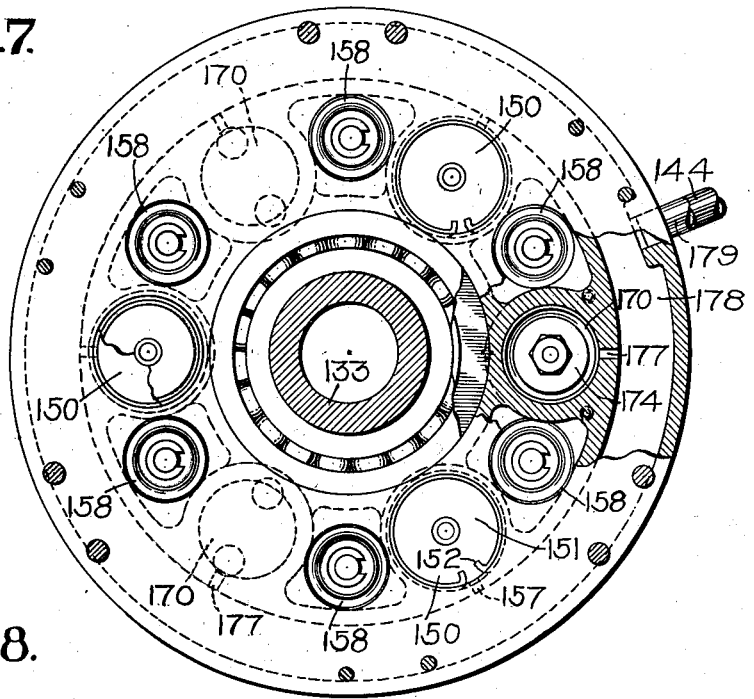
Fig. 7 is a sectional view taken on the line 7—7 of Fig. 6.

Also contained in the cylinder portion 127 are six spring motors 158 which, as best shown in Fig. 7 of the drawings are radially arranged, one at each side of each brake cylinder 150. These spring motors are operative independently or conjointly with the pistons 154 to effect an application of the brakes.

Each of these spring motors has a bore 159 which is open at the rear end of the cylinder portion 127. Contained in this bore and movable back and forth through the open end thereof is a tubular follower member 160 having at one end a perforated wall 161 which engages the inner end wall of bore and being open at the other end, the open end being provided with an annular flange 162 which extends toward the wall of the bore 159.

Interposed between and operatively engaging the forward wall of the cylinder portion 127 and the flange 162 of the follower member 160 is a spring 163 which is normally maintained compressed by the follower member.

Contained in the follower member is a plunger 165 which is movable back and forth longitudinally, which plunger at one end, is provided with a suitably attached collar 166. The opposite ends of the plungers 165 extend to the exterior of the forward wall of the cylinder portion 127 through suitable openings and rigidly support an annular ring 167 contained in the filling piece 126. This ring serves to rigidly connect these ends of the plungers together. Also contained in the follower member and interposed between and operatively engaging the end wall 161 of the member and the collars 166 on the plungers 165 are springs 168, which are normally maintained compressed by the collars 166 under the influence of three radially arranged fluid pressure brake releasing motors 170.

Each of these fluid pressure releasing motors has a bore 171 which is provided in the cylinder portion 127 between two of the spring motors 158. The bore 171 of each of these motors is open at the forward end of the cylinder portion 127, which open end is closed by a cover 172 which cover is secured to the cylinder portion in any desired manner such as by spaced bolts 173.

In the bore 171 of each fluid pressure release motor there is slidably mounted a movable abutment in the form of a piston 174 having a push rod or stem 175. Each push rod or stem 175 extends to the exterior of the cover 172 through a suitable opening and at its end is connected to the annular ring 167.

At the opposite sides of the pistons 174 there are pressure chambers 176, which are constantly connected with each other through passages 177 leading from a main circular passage 178 in the cylinder portion 127. The passage 178 is connected to a pipe 179 through which fluid under pressure is adapted to be supplied to and released from said main passages.

The supply of fluid under pressure to and its release from the pressure chambers 176 by way of passages 177, passage 178 and pipe 179 may be controlled in any desired manner, as for instance, the pipe 179 may be connected to the usual emergency pipe of a brake equipment which is normally charged with fluid under pressure and which in case of emergency is adapted to be vented for effecting an emergency application of the brakes. When the pressure chambers 176 are charged with fluid under pressure from the control pipe 179, such pressure acting on the pistons 174, is adapted to move the pistons to their normal release position. Movement of each of the three pistons 174 to this position is adapted to compress the springs 163 and 168, through the medium of the push rods or stems 175, annular ring 167 and the plungers 165. Upon the venting of fluid under pressure from the chambers 176 the force of the springs 163 and 168 is adapted to urge ring 167 in a direction toward the left hand or away from the differential housing 2, such movement in turn will urge the annular brake elements or disks into frictional interengagement in a manner to effect an application of the brakes.

Radially disposed about the enlarged portion 145 of shaft 133 and circumferentially spaced from each other are longitudinally extending spacing members 180, which are secured at one end to the cylinder portion 127 by means of bolts 181, the cylinder portion forming a rigid tie between the members.

Abutting the other or left hand end of the spacing members 180 is an annular disk 182 which is coaxially arranged with relation to the enlarged portion 145 of the shaft 133 and which is provided with a central opening through which the threaded end of the enlarged portion 145 projects. The threaded end of the enlarged portion 145 is enclosed by a cup shaped cap 183 which is removably secured to the annular disk 182, by means of screws 184.

Three annular rotatable friction brake elements or disks 185, 186 and 187 encircle the enlarged portion of the shaft 133 and are splined thereto, to provide a driving and supporting connection between the enlarged portion 145 of the shaft 133 and said brake elements so that these brake elements at all times turn with the shaft 133.

Contained in the enlarged portion 145 of the shaft 133 is a release spring 188 which spring is interposed between and operatively engages the nut 147 and the element or disk 185 for at all times urging the element to a brake release position defined by a shoulder 189 provided on the inside diameter of each of the fingers 148. The spring 188 extending through a central opening in the rotatable elements or disks 187 and 186. A shorter spring 190 is interposed between and operatively engages the nut 147 and the element or disk 186 for urging the element 186 to its brake release position which is defined by a shoulder 191 also provided on the inside diameter of the finger 148, the spring 190 extending through a central opening in the element or disk 187. A still shorter spring 192 encircles the springs 188 and 190 which spring 192 is interposed between and operatively engages the nut 147 and the element or disk 187 for urging this element to its brake release position which is defined by a shoulder 193 also provided on the fingers 148 of the enlarged portion 145.

A plurality of annular non-rotatable friction brake elements or disks 195, 196, 197 and 198 are interleaved with the rotatable elements 185, 186 and 187. The non-rotatable element or disk 195 is disposed at one end of the pile adjacent one face of the rotatable element 185, the non-rotatable element 196 is disposed between the rotatable elements 185 and 186, the non-rotatable element 197 is disposed between the rotatable elements 186 and 187, while the non-rotatable element 198 is disposed adjacent the outer face of the rotatable element 187 at the opposite end of the pile. It will be noted that the outside diameter of portions of the non-rotatable elements or disks is greater than the outside diameter of the circle occupied by the spacing members 180 and that each of the non-rotatable disks 195, 196 and 197 are provided with suitable slots adapted to receive a bearing portion of the spacing members 180 upon which each of said elements are slidably mounted. The spacing members thus act to support the non-rotatable members 195, 196 and 197 in coaxial relation with the rotatable braking elements and also holds them against axial rotation relative to the cylinder portion 127. The non-rotatable element 198 disposed adjacent the outer face of the rotatable element 187 is clamped between the annular ring member 182 and the spacing members 180 so that it is rigidly fixed in the position shown in the drawings.

Projecting from the rear or left hand face of the cylinder portion 127 there are three sets of stop pins, each set comprising two stop pins 200 and 201, which are alternately spaced with relation to the spacing members 180 at the outer periphery of the rotating elements or disks 185, 186 and 187. The stop pins 200 extend through suitably aligned openings in the non-rotatable element or disk 195 and the end of each pin is adapted to be engaged by the non-rotatable braking element 196 for defining the release position of said element in which position it is disengaged from the rotatable braking elements 185 and 186. The stop pins 201 extend through suitable radially aligned openings in the non-rotatable elements or disks 195 and 196, and the ends of each of these pins is adapted to be engaged by the non-rotatable braking element 187 for defining the release position of said element in which position it is disengaged from the rotatable braking elements 186 and 187. The non-rotatable braking element or disk 195 is adapted to abut the end of each of the brake cylinder piston stems or push rods 155, so that the release position of the braking element or disk 195 is defined by the push rods or stems 155 when the pistons 154 are in their release position. In order to move the non-rotatable elements or disks 195, 196 and 197 to their respective release positions, just described, three sets of release springs are provided. Each set of release springs comprise three springs 203, 204 and 205, which are alternately spaced with relation to the spacing members 180 at the outer periphery of the rotating elements or disks. The springs 203 are interposed between and operatively engage the annular disk 182 and the non-rotatable element or disk 197 and act to move the element or disk 197 against the stop pins 201. In like manner the springs 204 are interposed between and operatively engage the annular ring 182 and the non-rotatable element or disk 196 and act to move the element or disk 196 against the stop pin 200, while the springs 205 are interposed between and operatively engage the annular ring 182 and the non-rotatable element or disk 195 and act to move the element or disk 195 to its release position abutting the ends of the push rods or stems 155.

*Operation of embodiment shown in Figs. 6 to 9*

While the several parts of the mechanism differ in structural detail the operation of the mechanism generally is substantially the same as in the first embodiment of the invention. It will be understood however, that in this embodiment the braking will be effected through the mechanism of the brake shaft 129 and brake pinion 128.

Having now described my invention, what I claim as new and desire to secure by Letters Patent, is:

1. In a brake mechanism for a vehicle of the type having a differential housing and an axle differential mechanism mounted in said housing, in combination, an assembly of annular friction brake elements comprising a rotatable brake element arranged to rotate with said shaft and a non-rotatable brake element disposed to frictionally engage said rotatable brake element for braking said shaft, an annular brake cylinder device carried by said housing and disposed at one end of said assembly of brake elements and operative to effect the interengagement of said brake elements to brake said shaft, spring means carried by the brake cylinder device operative to effect interengagement of said brake elements to brake said shaft, a release cylinder disposed at the opposite end of said assembly of brake elements operative by fluid under pressure for normally rendering said spring means ineffective and operative upon the release of fluid under pressure to render said spring means effective to cause the interengagement of the braking elements to brake said shaft, and means interposed between the brake cylinder device and the release cylinder for securing said release cylinder to said brake cylinder device.

2. In a brake mechanism for a vehicle of the type having a differential housing and an axle differential mechanism mounted in said housing, in combination, an assembly of annular friction brake elements comprising a rotatable brake element arranged to rotate with said shaft and a non-rotatable brake element disposed to frictionally engage said rotatable brake element for braking said shaft, an annular brake cylinder device carried by said housing and disposed at one end of said assembly of brake elements and operative to effect the interengagement of said brake elements to brake said shaft, spring means carried by the brake cylinder device operative to effect interengagement of said brake elements to brake said shaft, a release cylinder disposed at the opposite end of said assembly of brake elements operative by fluid under pressure for normally rendering said spring means ineffective and operative upon the release of fluid under pressure to render said spring means effective to cause the interengagement of the braking elements to brake said shaft, and spacing means for rigidly securing said release cylinder in spaced relation to said brake cylinder device, said spacing means having a connection with said non-rotatable element for holding said non-rotatable element against rotation.

3. In a brake mechanism for a vehicle of the type having a differential housing and an axle differential mechanism mounted in said housing, in combination, a drive shaft for said differential mechanism including a first portion leading from and rotatable by means of a driving motor, a second portion rotatable mounted in said housing, a sleeve portion interposed between and connected to said first and said second portion for rotating said second portion with said first portion; a rotatable brake element secured to said sleeve for rotation therewith, a non-rotatable brake element carried by said housing and arranged for braking interengagement with said rotatable brake element, a brake cylinder device carried by said housing and disposed in coaxial relation with said braking elements operative to effect interengagement of the brake elements to brake said shaft, and spring means carried by the brake cylinder device operative to effect interengagement of the brake elements to brake said shaft.

4. In a brake mechanism for a vehicle of the type having a differential housing and an axle differential mechanism mounted in said housing, in combination, a removable cover for closing one end of said housing, a drive shaft for said differential mechanism rotatably mounted in said housing and extending through said cover, a rotatable brake element arranged to rotate with said shaft, a non-rotatable brake element carried by said cover and arranged for braking interengagement with said rotatable brake element, and means carried by said cover operative to effect the interengagement of said brake element to brake said shaft, said means comprising a fluid pressure motor and a spring motor.

5. In a brake mechanism for a vehicle of the type having a differential housing and an axle differential mechanism mounted in said housing, in combination, a removable cover for closing one end of said housing, a drive shaft for said differential mechanism rotatably mounted in said housing and extending through said cover, a rotatable brake element arranged to rotate with said shaft, a non-rotatable brake element carried by said cover and arranged for braking interengagement with said rotatable brake element, means carried by said cover operative to effect the interengagement of said brake elements to brake said shaft, said means comprising both a fluid pressure motor and a spring motor, and other means carried by said cover operative by fluid under pressure for normally rendering said spring motor ineffective and operative upon the release of fluid under pressure to render said spring motor effective to effect interengagement of the braking elements to brake the shaft.

6. In a brake mechanism for a vehicle of the type having a differential housing and an axle differential mechanism mounted in said housing, in combination, a drive shaft for said differential mechanism rotatably mounted in said housing, an assembly of annular frictional brake elements comprising a rotatable brake element arranged to rotate with said shaft and a non-rotatable brake element disposed to frictionally engage said rotatable element for braking said shaft, an annular brake cylinder device carried by said housing disposed at one end of said assembly of brake elements, said brake cylinder device comprising a plurality of radially arranged brake cylinder pistons operative by fluid under pressure to effect interengagement of said braking elements and a plurality of springs alternately arranged with relation to the brake cylinder pistons operative to also effect interengagement of said braking elements, and means rigidly secured to the brake cylinder device and disposed at the opposite end of said assembly of brake elements operative by fluid under pressure to render said spring means ineffective and upon the release of fluid under pressure effective to effect interengagement of said braking elements.

7. In a brake mechanism for a vehicle of the type having a differential housing and an axle differential mechanism mounted in said housing, in combination, a rotatable shaft cooperating with said differential mechanism, an annular rotatable friction brake element secured to rotate with said shaft, an annular non-rotatable friction brake element disposed in coaxial relation with said rotatable brake element and adapted to be moved axially into frictional engagement with said rotatable brake element to effect braking of said shaft, a brake cylinder device rigidly secured to said housing and having a plurality of piston bores arranged radially around and parallel to said shaft, a piston slidably mounted in each of said bores and operative by fluid under pressure to move said non-rotatable brake element into frictional contact with said rotatable brake element, a plurality of springs carried by said brake cylinder device and spaced from each other around said bores operative to move said non-rotatable brake element into frictional contact with said rotatable brake element, and a plurality of pistons carried by said brake cylinder device connected to said springs and operative by fluid under pressure for rendering said springs ineffective, said springs becoming effective upon the release of fluid under pressure on said pistons.

8. In a brake mechanism for a vehicle of the type having a differential housing and an axle differential mechanism mounted in said housing, in combination, a rotatable shaft cooperating with said differential mechanism, an assembly of annular friction brake elements comprising a rotatable brake element arranged to rotate with said shaft and a non-rotatable brake element disposed to frictionally engage said rotatable brake element for braking said shaft, and means carried by said housing disposed at one end of said assembly of brake elements and operative to effect the interengagement of said brake elements to brake said shaft, said brake cylinder device comprising, a plurality of equally spaced radially arranged pistons operative by fluid under pressure to effect interengagement of said brake elements and a plurality of springs radially arranged and disposed one at each side of each of said pistons to also effect interengagement of said braking elements and a plurality of radially arranged release pistons each being disposed between each two of said springs and being operative by fluid under pressure for normally rendering said springs ineffective and being operative upon the release of fluid under pressure to render said springs effective to effect interengagement of the braking elements to brake said shaft.

9. In a brake mechanism for a vehicle of the type having a differential housing and an axle differential mechanism mounted in said housing, in combination, a rotatable shaft cooperating with said differential mechanism, an assembly of annular friction brake elements disposed adjacent one end of said shaft, said assembly comprising a rotatable brake element arranged to rotate with said shaft and a nonrotatable brake element disposed to frictionally engage said rotatable brake element for braking said shaft, a casing disposed between said housing and said assembly of annular friction brake elements and rigidly secured to said housing, said casing having a cylinder block portion disposed adjacent one end of said assembly of braking elements and containing a plurality of fluid pressure motors and a plurality of spring motors, said motors both being operative to effect interengagement of the brake elements to brake said shaft and a plurality of release cylinders for normally rendering said spring motors ineffective and operative upon the release of fluid under pressure to render said spring motors effective to cause the interengagement of the brake elements to brake said shaft, an annular non-rotatable disk disposed adjacent the opposite end of said assembly of brake elements for limiting axial movement of said assembly in one direction, and spacing means for rigidly securing said annular non-rotatable disk to said casing.

10. In a brake mechanism for a vehicle of the type having a differential housing and an axle differential mechanism mounted in said housing in combination, a casing rigidly secured to said housing adjacent one end thereof, a rotatable shaft cooperating with said differential mechanism having an enlarged end portion projecting beyond said casing, a rotatable brake element secured to the enlarged projecting end portion of said shaft for rotation therewith, a non-rotatable brake element adapted to be moved into frictional engagement with said rotatable brake element for braking said shaft, a plurality of support members rigidly connected to said casing, said support members extending parallel to the enlarged portion of said shaft and disposed adjacent the outer periphery of said rotatable brake element and having a connection with said non-rotatable brake element for holding said non-rotatable brake element against rotation, and means disposed in said casing operative to effect movement of said non-rotatable brake element into frictional engagement with said rotatable brake element to brake said shaft, said means comprising a spring motor for actuating the non-rotatable brake element and also comprising a fluid pressure responsive motor operative to control the operation of said spring motor.

11. In a brake mechanism for a vehicle of the type having a differential housing and an axle differential mechanism mounted in said housing, in combination, a casing rigidly secured to the rear end of said housing, a rotatable brake shaft journaled at each end of said casing and cooperating with said differential mechanism, said brake shaft having a portion projecting rearwardly beyond said casing, a rotatable brake element encircling and secured to the projecting portion of said shaft for rotation therewith, a non-rotatable brake element carried by said casing and arranged for braking interengagement with said rotatable brake element, and means carried by the casing operative to effect the interengagement of said brake elements to brake said shaft, said means comprising a spring motor for effecting the interengagement of the brake elements and also comprising a fluid pressure responsive motor for controlling the operation of said spring motor.

12. In a brake mechanism for a vehicle of the type having a differential housing and an axle differential mechanism mounted in said housing in combination, a casing rigidly secured to the rear end of said housing, a rotatable brake shaft journaled at each end of said casing and cooperating with said differential mechanism, said brake shaft having a portion projecting rearwardly beyond said casing, a rotatable brake element encircling and secured to the projecting portion of said shaft for rotation therewith, a non-rotatable brake element carried by said casing and arranged for braking interengagement with said rotatable brake element, a plurality of radially arranged pistons disposed in said casing operative by fluid under pressure to effect interengagement of said braking elements, a plurality of springs radially arranged in said casing around said piston to also effect interengagement of said braking elements, and another plurality of radially arranged pistons disposed in said casing operative by fluid under pressure for energizing said springs and operative upon the release of fluid under pressure for rendering said spring means effective.

13. In a brake mechanism for a vehicle of the type having a differential housing and an axle differential mechanism mounted in said housing, in combination, a casing rigidly secured to the rear end of said housing, a rotatable brake shaft journaled in said casing and having a portion extending rearwardly beyond said casing, a rotatable brake element arranged to rotate with said shaft, a non-rotatable brake element carried by said casing and arranged for braking interengagement with said rotatable brake element, a plurality of spaced radially arranged brake applying pistons disposed in said casing operative by fluid under pressure to effect interengagement of said braking elements and a plurality of radially arranged brake applying springs disposed in said casing to also effect interengagement of said braking elements, and a plurality of radially arranged brake releasing pistons in said casing operative by fluid under pressure for compressing said springs and operative upon the release of fluid under pressure for permitting said springs to expand to cause said braking elements to frictionally engage with each other.

14. In a brake mechanism for a vehicle of the type having a differential mechanism comprising a drive pinion and a ring gear mounted in a differential housing, in combination, a casing rigidly secured to the rear end of said housing, a brake shaft rotatable mounted in said casing and having an end portion extending rearwardly beyond said casing, a brake pinion on said shaft in mesh with said ring gear, a rotatable brake element encircling said shaft and secured to the projecting end of said shaft for rotation therewith, a non-rotatable brake element carried by said casing and arranged for braking interengagement with said rotatable brake element, and means carried by said casing operative to effect the interengagement of said brake elements to brake said shaft, said means comprising a spring motor for effecting the interengagement of the brake elements and also comprising a fluid pressure responsive motor for controlling the operation of said spring motor.

15. In a brake mechanism for a vehicle of the type having a differential housing and an axle differential mounted in said housing, in combination, a casing rigidly secured to said housing adjacent one end thereof, a rotatable shaft cooperating with said differential mechanism having an enlarged end portion projecting beyond said casing, a pile of interleaved rotatable and non-rotatable annular friction braking element encircling the enlarged projecting end of said shaft with a non-rotatable element disposed at both the inner and outer ends of said pile, spacing means for rigidly securing the outer non-rotatable element to said casing, said other non-rotatable elements being splined to said spacing means and being capable of movement in a direction longitudinally of said shaft, said rotatable elements being splined to the enlarged end portion of said shaft and being capable of movement in a direction longitudinally of said shaft springs acting on said non-rotatable elements for moving same into predetermined spaced relation, springs acting on said rotatable elements for moving same into predetermined spaced relation, and means carried by said casing and operatively connected to said inner non-rotatable element for controlling movement of said pile of elements into frictional braking engagement with each other, said means having a position for permitting said springs to move said elements into spaced relation.

16. In a brake mechanism for a vehicle of the type having a differential housing and an axle differential mounted in said housing, in combination, a casing rigidly secured to said housing adjacent one end thereof, a rotatable shaft cooperating with said differential mechanism having an enlarged end portion projecting beyond said casing, a pile of interleaved rotatable and non-rotatable annular friction braking elements encircling the enlarged projecting end of said shaft with a non-rotatable element disposed at both the inner and outer ends of said pile, spacing means for rigidly securing the outer non-rotatable element to said casing, said other non-rotatable elements being splined to said spacing means and being capable of movement in a direction longitudinally of said shaft, said rotatable elements being splined to the enlarged end portion of said shaft and being capable of movement in a direction longitudinally of said shaft springs acting on said non-rotatable elements for moving same into predetermined spaced relation, springs acting on said rotatable elements for moving same into predetermined spaced relation, a brake cylinder device carried by said casing and operatively connected to said inner non-rotatable element for controlling movement of said pile of elements into frictional braking engagement with each other, and spring means carried by the casing and operatively connected to said inner non-rotatable element for controlling movement of said pile of elements into frictional braking engagement with each other, said brake cylinder device and said spring means each having a release position for permitting said springs to move said elements into spaced relation.

17. In a brake mechanism for a vehicle of the type having a differential housing and an axle differential mounted in said housing, in combination, a casing rigidly secured to said housing adjacent one end thereof, a rotatable shaft cooperating with said differential mechanism having an enlarged end portion projecting beyond said casing, a pile of interleaved rotatable and non-rotatable annular friction braking elements encircling the enlarged projecting end of said shaft with a non-rotatable element disposed at both the inner and outer ends of said pile, spacing means for rigidly securing the outer non-rotatable element to said casing, said other non-rotatable elements being splined to said spacing means and being capable of movement in a direction longitudinally of said shaft, said rotatable elements being splined to the enlarged end portion of said shaft and being capable of movement in a direction longitudinally of said shaft, springs acting on said non-rotatable elements for moving same into predetermined spaced relation, springs acting on said rotatable elements for moving same into predetermined spaced relation, a brake cylinder device carried by said casing and operatively connected to said inner non-rotatable element for controlling movement of said pile of elements into frictional braking engagement with each other, spring means carried by the casing and operatively connected to said inner non-rotatable element for controlling movement of said pile of elements into frictional braking engagement with each other, said brake cylinder device and said spring means each having a release position for permitting said springs to move said elements into spaced relation and means carried by said casing operative by fluid under pressure for normally rendering said spring means ineffective and operative upon the release of fluid under pressure to render said spring means effective to move said pile of elements into frictional braking engagement with each other.

18. In a brake mechanism for a vehicle of the type having a differential housing and an axle differential mounted in said housing in combination, a casing rigidly secured to said housing adjacent one end thereof, a rotatable shaft cooperating with said differential mechanism having an enlarged tubular end portion projecting beyond said casing, a pile of interleaved rotatable and non-rotatable annular friction braking elements encircling the enlarged projecting end of said shaft with a non-rotatable element disposed at both the inner and outer ends of said pile, spacing means for rigidly securing the outer non-rotatable element to said casing, said other non-rotatable elements being splined to said spacing means and being capable of movement in a direction longitudinally of said shaft, said rotatable elements being splined to the enlarged portion of said shaft and being capable of movement in a direction longitudinally of said shaft, springs acting on said non-rotatable elements for moving same into predetermined spaced relation, springs contained in the enlarged tubular end portion of said shaft acting on said rotatable elements for moving same into predetermined spaced relation, a brake cylinder device carried by said casing and operatively connected to said inner non-rotatable element for controlling movement of said pile of elements into frictional braking engagement with each other, spring means carried by the casing and operatively connected to said inner non-rotatable element for also controlling movement of said pile of elements into frictional braking engagement with each other, said brake cylinder device and said springs having a position for permitting said springs to move said elements into spaced relation.

19. In a brake mechanism for a rotatable shaft comprising a plurality of longitudinally aligned operatively connected sections, in combination, a non-rotatable member in which one of said sections is journalled, a brake element carried by and rotatable with another of said sections, a non-rotatable brake element carried by said non-rotatable member and arranged for braking interengagement with the rotatable brake element, and means carried by the non-rotatable member and operative for effecting the braking interengagement of the brake elements, said means comprising a spring motor for effecting the interengagement of the brake elements and also comprising a fluid pressure responsive motor for controlling the operation of said spring motor.

20. In a brake mechanism for a rotatable shaft comprising a plurality of longitudinally aligned operatively connected sections, in combination, a non-rotatable member in which one of said sections is journalled, a brake element carried by and rotatable with another of said sections, a non-rotatable brake element carried by said non-rotatable member and arranged for braking interengagement with the rotatable brake element, piston means carried by the non-rotatable member and operative upon the supply of fluid under pressure thereto for effecting the braking interengagement of the brake elements, spring means carried by the non-rotatable member and operative for effecting the braking interengagement of the brake elements, and other piston means also carried by the non-rotatable member responsive to the pressure of fluid for rendering said spring means ineffective to effect the braking interengagement of said brake elements and operative upon the release of fluid under pressure therefrom for permitting said spring means to act to effect the braking interengagement of the brake elements.

21. In a brake mechanism for a rotatable shaft comprising a plurality of longitudinally aligned operatively connected sections, in combination, a non-rotatable member in which one of said sections is journalled, a brake element carried by and rotatable with another of said sections, a non-rotatable brake element carried by said non-rotatable member and arranged for braking interengagement with the rotatable brake element, fluid pressure controlled means carried by the non-rotatable member and operative upon an increase in the pressure of fluid for effecting the braking interengagement of the brake elements, spring means carried by the non-rotatable member and operative for effecting the braking interengagement of the brake elements, and other fluid pressure controlled means carried by the non-rotatable member responsive to the pressure of fluid for rendering said spring means ineffective to effect the braking interengagement of said brake elements and operative upon a reduction in fluid pressure to permit said spring means to act to effect the braking interengagement of the brake elements.

22. A brake mechanism comprising in combination, a casing, a rotatable brake shaft journaled in said casing, an annular rotatable member encircling and secured to said shaft for rotation with the shaft, an annular brake stator arranged for braking interengagement with said member, spring means disposed in said casing for actuating said stator into interengagement with said member, fluid pressure responsive means also disposed in said casing and operative upon an increase in fluid under pressure for actuating said stator into interengagement with said member, and means disposed in said casing operative by fluid under pressure for compressing said spring means and operative upon the release of fluid under pressure to permit said spring means to expand and thereby cause the interengagement of said stator and member.

JOSEPH C. McCUNE.